March 31, 1964     F. PLASSER ETAL     3,126,640
MEANS FOR MEASURING THE TRANSVERSE INCLINATION OF A TRACK
Filed Oct. 25, 1960
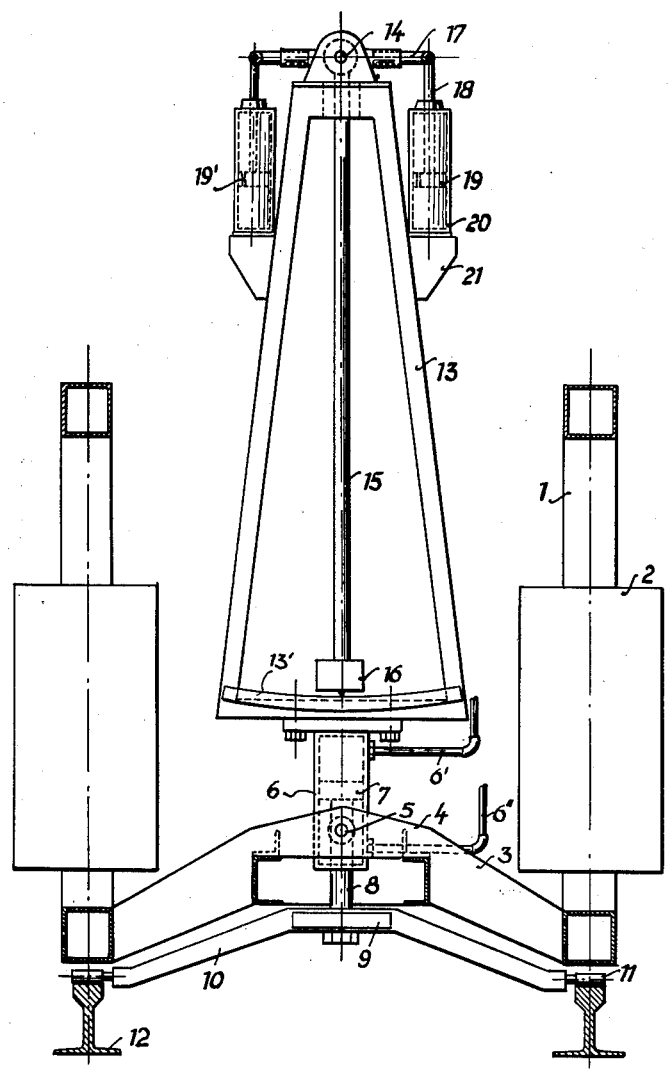
INVENTORS
FRANZ PLASSER
JOSEF THEURER
BY
AGENT

United States Patent Office 3,126,640
Patented Mar. 31, 1964

3,126,640
MEANS FOR MEASURING THE TRANSVERSE
INCLINATION OF A TRACK
Franz Plasser and Josef Theurer, both of Johannesgasse 3,
Vienna, Austria
Filed Oct. 25, 1960, Ser. No. 64,939
Claims priority, application Austria Nov. 13, 1959
5 Claims. (Cl. 33—145)

The present invention relates to means for measuring the transverse inclination of a track during track grading operations.

It is known to mount transverse track inclination measuring means on mobile machines used in track maintenance and grading, such as track tampers and/or track raising apparatus. For this purpose, it has been proposed to mount a pendulum for pivotal movement in a vertical plane perpendicular to the track on the mobile machine and to read the vertical inclination of the track from a scale cooperating with an indicator on the pendulum. One such mechanism has been disclosed, for instance, in our copending U.S. Patent application Serial No. 5,211, filed January 28, 1960, now Patent No. 3,111,907 dated November 26, 1963.

However, when such a pendulum is mounted on a relatively long mobile machine moving on the track on two spaced trucks, for instance, its transverse inclination measurements are not quite accurate because the machine carriage resting on four or more wheels assumes a somewhat twisted position and thus falsifies the reading of the transverse track inclination. Mobile track grading and tamping machines usually have a rather long chassis or carriage and the transverse inclination of the track will differ at various points along the carriage length so that its measurement at any point except above the axles will give a false reading.

It is the primary object of the present invention to avoid faulty readings of the transverse track inclination determined by a pendulum of the described type and to mount such a transverse inclination measuring means at any point of a car, where it will operate independently of the transverse inclination of the car axle or axles and where its measuring position will correspond truly to the inclination of the track and independent of the position of the car.

We accomplish this and other objects in accordance with this invention by supporting the pendulum on a frame which, in turn, is supported pivotally in respect of the car for pivotal movement in a vertical plane perpendicular to the track and by mounting sensing elements, such as rollers, on the pendulum supporting frame for engagement with the track rails. With this independent mounting of the pendulum, the transverse inclination indication is effected without regard to the structure and position of the car. The pendulum also is not influenced by any vibrations to which the car may be subjected, such as may be the case with tamping machines carrying heavy vibratory tamping tools, thus eliminating a further cause for inaccurate measurements.

In accordance with a preferred embodiment of the invention, the sensing elements are mounted at the ends of a transverse carrier which extends underneath the car and which is fixedly movable with the pendulum supporting frame. To facilitate the movement of the sensing elements into and out of contacting engagement with the track rails, the transverse carrier may be vertically adjustable in respect of the frame and/or the car.

According to another preferred embodiment, the pivotal movements of the pendulum are rapidly stopped and the time involved in each measurement is thus considerably shortened. For this purpose, means for damping the pendulum movement is mounted on the pendulum supporting frame so that a braking action is exerted upon the pendulum in relation to the pivotal frame.

The above and other objects, advantages and features of the present invention will appear more fully from the following detailed description of a specific embodiment thereof, provided merely, for purposes of illustration and without in any way limiting the scope of the invention.

The single figure of the accompanying drawing schematically shows an end view of a means for measuring the transverse inclination of a track according to the invention.

In the accompanying drawing, the transverse inclination measuring means is shown mounted on the car of a conventional track tamping machine. Since the car in respect of which the measuring means is pivotal forms no part of the present invention, except inasmuch as it is combined therewith, it is only schematically indicated to show the usual car frame portions 1 in vertical alignment with the rails 12 and supporting the vertically adjustable tamping tool carriers 2. While, as stated, the invention has nothing to do with the specific car or tamping machine, tampers such as shown in our U.S. Patents Nos. 2,876,709 or 2,915,018 have been very successful in operation and may be used.

The lateral car frame portions 1 are connected by transverse beam 3 forming a central bearing 4 for the pivot 5. Vertical cylinder 6 is mounted on the pivot for pivotal movement in a vertical plane perpendicular to the track and has connected thereto pressure fluid means including conduits 6' and 6" for supplying a pressure fluid, for instance compressed air, to the cylinder chambers. Piston 7 is reciprocably movable in cylinder 6 and a two-armed carrier 10 is fixedly connected by means of plate 9 to the outer end of piston rod 8 whose other end is fixedly connected to the piston 7. The carrier 10 extends underneath the car and its two ends adjacent the track rails 12 carry rollers 11 which constitute sensing elements in engagement with the rails when the measuring means is in operation.

Pendulum supporting frame 13 is fixedly mounted on a support means constituted by the vertical cylinder, for instance by the indicated bolts so as to pivot in unison with the cylinder and the transverse carrier 10. Frame 13 carries a pivot 14 for supporting pendulum 15 for pivotal movement in a vertical plane perpendicular to the track, the indicator 16 of the pendulum cooperating with the measuring scale 13' on the supporting frame to facilitate a reading of the measured inclination.

For damping and braking the swing of the pendulum, we provide the illustrated damping means mounted on the pendulum supporting frame 13. This comprises a pair of cylinders 20 mounted on brackets 21, a piston 19 being reciprocably movable in each cylinder and dividing the cylinder into two chambers. The pendulum and pistons are connected for synchronous movement, the illustrated connected means including a telescopic arm 17 linked to each piston rod 18. The length of the telescopic arms 17 may be adjusted. Pressure liquid means is connected to one of the cylinder chambers, i.e. the lower chamber, to fill the same with a pressure liquid, for instance oil, and a pressure liquid passage 19' is provided in the piston.

When the pendulum swings and thus causes a vertical movement of piston 19 downwardly, the pressure liquid is forced to pass through bore 19' into the other cylinder chamber, thus causing damping of the pendulum movement in a known manner.

The operation of the apparatus is evident from the preceding description of its essential parts and their cooperation.

When it is desired during a track grading operation to measure the transverse inclination of the track, pressure fluid, for instance compressed air, is supplied to cylinder 6 through conduit 6' so as to depress piston 7 and to force rollers 11 into engagement with the track rails 12. The relative position of the two sensing elements 11 corresponds to the transverse inclination of the track and this is automatically transmitted to the carrier 10, the cylinder 6 and the pendulum supporting frame 13 which form a unit which moves in unison. The supporting frame 13 will thus produce a pivotal movement of pendulum in response to any angle of the track which deviates from the horizontal and independent of the position of the car. The transverse inclination of the track will be shown by indicator 16 on scale 13'.

When it is desired to move the measuring means into an inoperative position, for instance when the car is moved to another location, the carrier 10 may be manually or mechanically swung into a position which is more or less parallel with the track and wherein the sensing elements 11 are out of contact with the track, the carrier being lifted away from the track by supplying pressure fluid to cylinder 6 through conduit 6". If it is desired to hold the carrier in the operative and/or inoperative position and to prevent its descent, conventional stops may be provided to hold the carrier and the sensing elements temporarily in the desired position.

Many variations and modifications of the illustrated structure may occur to the skilled in the art. For instance, the means for vertically adjusting the carrier of the sensing elements and for exerting a downward pressure thereon in the operative position may take any suitable form, the illustrated fluid pressure means being replaced by spring means, for instance. The essential feature of the invention is the support of the pendulum supporting frame independently, and pivotally in respect, of the car and the scope of the invention is defined only in the appended claims.

What we claim is:

1. In the combination of a track tamping machine including a car frame with front and rear trucks movable on the track rails and a pendulum means for measuring the transverse inclination of the track, and wherein a frame supports said pendulum means for pivotal movement in a vertical plane perpendicular to the track: a support means for said pendulum supporting frame, means pivotally mounting the support means on the car frame forwardly of the front truck for pivotal movement in said plane and in respect of said car frame, a carrier extending transversely of said track and mounted on said pendulum supporting frame supporting means for pivotal movement in unison therewith in said plane, sensing elements mounted on said carrier for engagement with said track rails, and means for vertically adjusting the carrier in a fixed vertical position in relation to the car frame whereby the sensing elements may be moved into, and out of, engagement with the rails.

2. In the combination of claim 1, said sensing elements being rollers.

3. In the combination of claim 1, said transverse carrier extends from the support means underneath the car frame with two ends adjacent the track rails, said sensing elements being mounted on each of said carrier ends.

4. In the combination of claim 1, wherein said support means includes a vertical cylinder fixedly mounted on the pendulum supporting frame, and said vertical adjusting means for the carrier includes a piston reciprocably movable in said cylinder, pressure fluid means connected to the cylinder for reciprocating the piston and a piston rod fixedly connected to the piston and the carrier, respectively, for supporting the carrier on the frame in a vertically adjustable manner.

5. In the combination of claim 1, means mounted on said pendulum supporting frame for damping the pivotal movement of the pendulum, said damping means comprising at least one cylinder mounted on the frame, a piston reciprocably movable in said cylinder and dividing the same into two chambers, means for connecting the pendulum to the piston for synchronous movement of pendulum and piston, pressure liquid means connected to one of said cylinder chambers and exerting a predetermined pressure on said piston, and said piston defining a pressure liquid passage leading to the other cylinder chamber.

References Cited in the file of this patent

UNITED STATES PATENTS

| 309,792 | McGregor | Dec. 23, 1884 |
| 2,113,785 | Drake | Apr. 12, 1938 |

FOREIGN PATENTS

| 466,135 | France | Feb. 21, 1914 |
| 657,880 | France | Jan. 21, 1929 |
| 181,281 | Switzerland | Mar. 2, 1936 |